United States Patent [19]

Föhl

[11] Patent Number: 4,462,648
[45] Date of Patent: Jul. 31, 1984

[54] APPARATUS FOR PROVIDING A RELIABLE ELECTRICAL CONNECTION

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 359,529

[22] Filed: Mar. 18, 1982

[30] Foreign Application Priority Data

Mar. 19, 1981 [DE] Fed. Rep. of Germany ....... 3110807

[51] Int. Cl.³ .......................................... H01R 39/00
[52] U.S. Cl. .................................. 339/3 S; 339/5 M; 339/6 R; 339/8 PB
[58] Field of Search ............... 339/3 R, 3 S, 5 R, 5 M, 339/5 P, 6 R, 8 R, 8 PB, 10

[56] References Cited

U.S. PATENT DOCUMENTS

| | | | |
|---|---|---|---|
| 2,474,070 | 6/1949 | Sokolik | 339/8 PB |
| 2,523,081 | 9/1950 | Wendt | 339/5 M |
| 2,790,152 | 4/1957 | Mohr | 339/8 PB |
| 3,089,113 | 5/1963 | Mohr | 339/8 P |
| 3,501,204 | 3/1970 | Schreffler | 308/1 R |
| 3,876,272 | 4/1975 | Tsutsumi et al. | 339/3 S |
| 4,006,954 | 2/1977 | Ikawa et al. | 339/8 R |
| 4,063,789 | 12/1977 | Kreisl | 339/3 S |
| 4,157,854 | 6/1979 | Beauch | 339/3 S |

FOREIGN PATENT DOCUMENTS

| | | | |
|---|---|---|---|
| 7204100 | 2/1972 | Fed. Rep. of Germany . | |
| 961224 | 11/1949 | France | 339/5 P |

*Primary Examiner*—Eugene F. Desmond
*Assistant Examiner*—Steven C. Bishop
*Attorney, Agent, or Firm*—Yount & Tarolli

[57] ABSTRACT

Device for the electrical connection of at least two structural elements which are disposed on the steering wheel axis of a motor vehicle and rotatable with respect to each other, preferably between a support part fixed to the chassis and an electrical ignition device of an airbag stored at the steering wheel serving as impact protection for the passenger, and wherein that rolling bodies made of an electrically conducting material are provided for the electrical connection, which are arranged between a stationary contact element and a rotatable contact element, whereby said contact elements are preloaded against each other.

9 Claims, 8 Drawing Figures

APPARATUS FOR PROVIDING A RELIABLE ELECTRICAL CONNECTION

CROSS-REFERENCE TO RELATED APPLICATION

My application Ser. No. 359,528, filed on Mar. 18, 1982, (Attorneys' Docket No. Reg. Nr. 3106).

BACKGROUND OF THE INVENTION

1. Field of the Invention

The invention relates to a device for the electrical connection of at least two structural elements which are disposed on the steering wheel axis of a motor vehicle and rotatable with respect to each other.

2. Description of the Prior Art

There are devices for the electrical connection between electrical parts which can rotate with respect to each other in motor vehicles, for example, required for the transfer of electrical signals from stationary structural parts attached at the vehicle-chassis to electrical devices arranged on the steering wheel. In the known arrangements, an electrical connection is effected between the battery of the vehicle and the switch of the horn mounted on the steering wheel by means of concentric contact elements at one part, and by slip-rings or contact brushes on the other part, whereby an electrical connection is provided during rotation. Electrical connecting devices of this type suffer from relatively high wear, and have the disadvantage, that they cause disturbing noise during their rotation. Furthermore, in such devices with sliding contact elements, relatively high electrical transfer resistances are encountered. A high transfer resistance is acceptable at electrical switching- or signal devices, in which-for example, when blowing the signal horn - relative large currents flow in the electrical connection line. However, such a connecting device is not acceptable for the cases where maximum contact reliability is the decisive factor, or in situations where only very small currents of only a few mA flow in the connection line, for example for test or control purposes, such as the electrical or electronic monitoring of the safety system of a vehicle. The explained known device is not suited for safety reasons for a vehicle-safety system, wherein an airbag serving as impact-protection for the passengers is fastened to the steering wheel, and the airbag is provided with an electrical ignition device, which is connected with an electrical sensor in the vehicle-chassis through an electrical connection, where the electrical sensor, in case of a crash, is activated and operates the ignition device, which in turn causes the airbag to inflate. It is desirable that this safety system be continuously monitored to indicate its readiness to operate. For this purpose an electrical control current of only a few mA flows continuously in the electrical connection system, to make certain that in an emergency the ignition device, for example a pyrotechnical charge, is reliably ignited.

SUMMARY OF THE INVENTION

A basic objective of the invention is to provide a device of the kind mentioned in which a uniform, reliable electrical connection is assured between the structural parts rotatable against each other, with low transfer resistance, and also good wear-proof properties.

With the foregoing and other objects in view, there is provided in accordance with the invention a device for the electrical connection of at least two structural elements which are disposed on the steering wheel axis of a motor vehicle and rotatable with respect to each other, which comprises a first structural element having a first contact element attached to the steering shaft and rotatable therewith, a second structural element having a stationary second contact element adjacent the first contact and spaced for the insertion of rolling bodies, said rolling bodies made of an electrically conducting material for electrical connection between the rotatable contact element and the stationary contact element, and means for urging the contact elements in contact with the rolling bodies.

Other features which are considered as characteristic for the invention are set forth in the appended claims.

Although the invention is illustrated and described herein as embodied in a device for the electrical connection between at least two structural elements which are disposed on the steering wheel axis of a motor vehicle, and which are rotatable with respect to each other, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
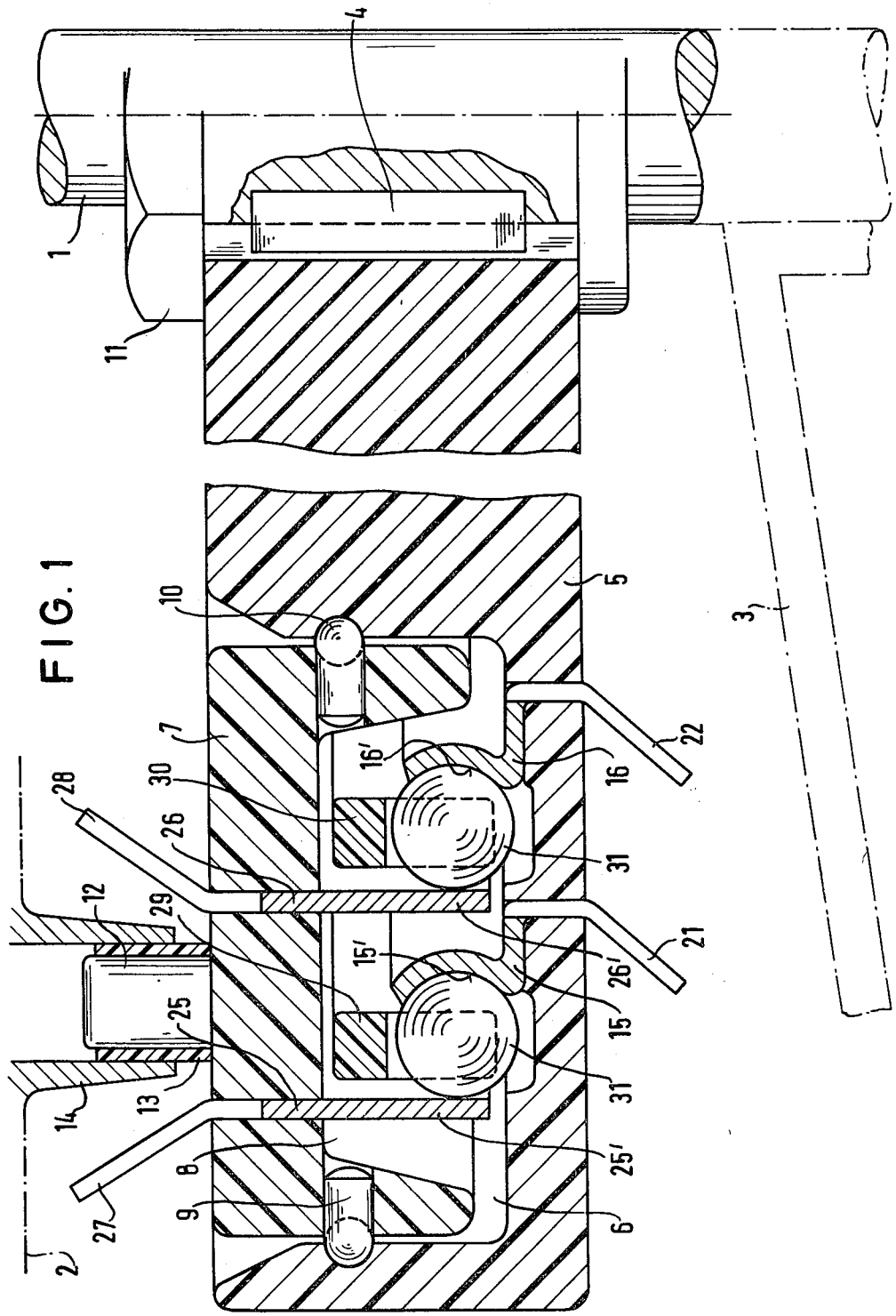
FIG. 1 is a partial-sectional view of the device according to the invention with radial preloading of the rolling elements, secured to the steering shaft of a motor vehicle.

In accordance with the invention rolling bodies made of an electrically conducting material are provided for the electrical connection. The rolling bodies are arranged between a stationary contact element and a rotatable contact element, and the contact elements are preloaded against each other. By the use of rolling bodies as contact elements between two structural parts which can rotate with respect to each other, whereby said rolling bodies are under preload in contact with the associated contact parts, is is assured, that this electrical connection functions practically without wear, and exhibits a very low transfer resistance, and does not generate any disturbing noise. With an electrical connection of this kind, one solves especially the contacting problems encountered in motor vehicles which are often subject to extreme vibration loads. Thereby, it is possible to let even extremely small control currents flow continuously through the special electrical connection, and maintain with assurance a uniform, operating readiness even after use of the connecting elements over a long period of time.

The invention also makes it possible to provide several electrical circuit connections within the device by means of several concentric contact element-pairs for the electric supply- and return lines.

According to an embodiment of the invention, ring-shaped contact elements are axially spring loaded against each other with interposed rolling bodies. As the spring elements, one can use ringshaped springs, for example, wavy springs, as well as electrically insulted spring elements made of a rubber-like, elastic material.

According to a preferred embodiment of the invention, ring-shaped contact elements are elastically tensioned in the radial direction against interposed rolling bodies. In this manner, a very flat form of the device according to the invention is made possible. Preferably, a ring-shaped contact element is sized so that it is resiliently deflected in a radial direction relative to another contact ring and an annular series of rotatable bodies to provide a spring force which continuously urges the rotatable bodies and contact rings into firm engagement. This results in a low resistance electrical connection between the contact rings and the rotatable bodies. In this way, a spring element is produced by simple means, which spring element does not have the disadvantage of conventional spring elements, i.e. a slow weakening of the spring force. By virtue of the special shape of the ring-shaped spring element alone the electrical connection is mechanically preloaded at rest as well as during the rolling motion, so that a reliable electrical contact between the above mentioned parts is assured at all times.

The invention is further explained by typical embodiments shown in the drawings.

Figure 2:
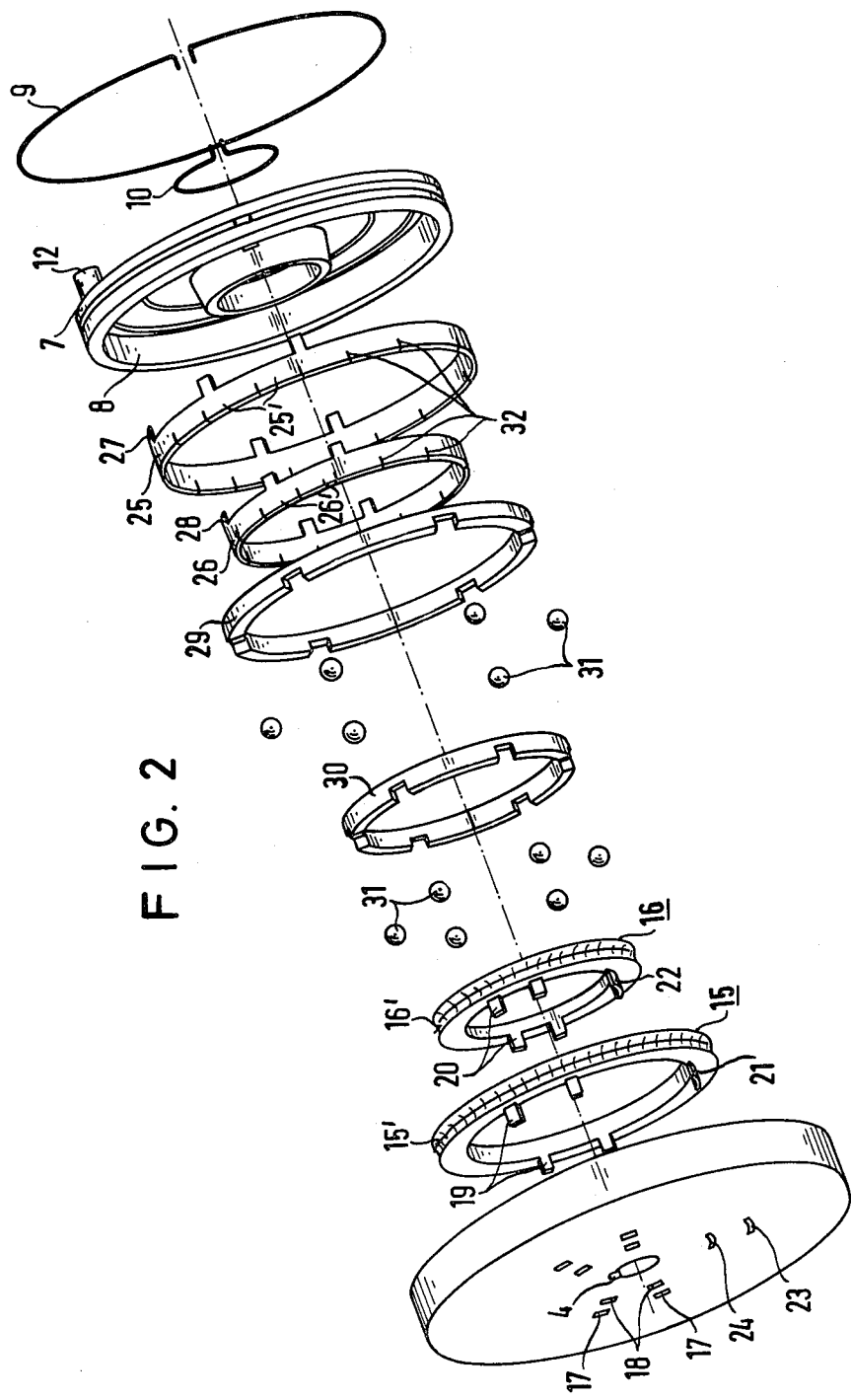
FIG. 2 is an exploded view of the device according to FIG. 1.

In the typical embodiment according to FIGS. 1 and 2, a steering shaft 1 of a motor vehicle, which is not further shown, has a steering wheel 3 fixedly attached at a distance from the vehicle-chassis at the driver side, indicated by dash-dot lines. Also fixedly attached at the steering shaft, for example by means of a drive key 4, is a circular support-plate 5, made, for example, of insulating plastic. Plate 5 is provided with a recess 6 which is concentric to the steering wheel axis. An annular cover-ring 7 may consist, for example, of an elastic synthetic material. This cover-ring 7 also has a ring-shaped recess 8, and can be fittingly inserted into the recess 6 of the support plate 5, and can be retained within the support plate 5 by two spring rings 9, 10 having different diameters. The support plate 5 is fastened to the steering shaft by means of nut 11. The cover-ring 7 is provided with at least one pin-like coupling element 12, which is coupled indirectly through a damping bushing 13 to a corresponding pin-like protrusion 14 of the motor vehicle chassis 2. In the recess 6 in the support plate 5, two annular contact elements 15 and 16 are disposed each of which is provided with four support lugs 19, respectively 20, which can be inserted and retained in slots 17, respectively 18 of the support plate 5. Each contact element 15 and 16 is also additionally provided with a lug-like electrical connection element 21, respectively 22, each of which projects into an additional slot 23, 24 in the support plate. Each lug serves to make contact with an electrical conductor, or electrical element which is not further shown. As FIG. 1 shows, the connection elements 21 and 22 are slightly bent after they are assembled. In a similar manner, the cover ring 7 carries two annular contact elements 25 and 26, which are concentric to each other, with corresponding support lugs, and electrical connection elements 27, 28, which in the same manner are fixed in corresponding slots in the cover ring 7. The contact elements 15 and 16 which are electrically insulated from each other, are provided with concave rubbing contact tracks 15' and 16' in the radial direction. Two radial ball-cages of different diameters are designated 29 and 30, in which rolling bodies 31 in the form of balls are disposed. The rolling bodies 31 are arranged, respectively tensioned between the bearing ends of the contact elements 15 and 25, and between contact elements 16 and 26 which face each other, i.e. between the rubbing contact tracks 15', 16' of the contact elements 15, 16, and the sleevelike ends of the contact elements 25 and 26. The elastic tensioning of the above-mentioned contact elements with the rolling bodies between them is effected in the embodiment according to FIGS. 1 and 2 in the radial direction by having the sleeve-like portions of the annular contact elements 25 and 26 provided around their circumference with springy segment tongues 25', respectively 26', separated by slots 32, by which tongues the rolling bodies 31 are pressed against the associated rubbing contact tracks 15' and 16'. Thereby, the division of the segment-tongues at the circumference of the annular contact elements 25, 26 is made different than the distribution of the rolling bodies. Thus, the contact elements 25, 26 serve as spring-elements for tensioning the rolling bodies 31, and simultaneously also serve as the contacting means, and are provided with electrical connection elements 27 and 28.

Figure 4:
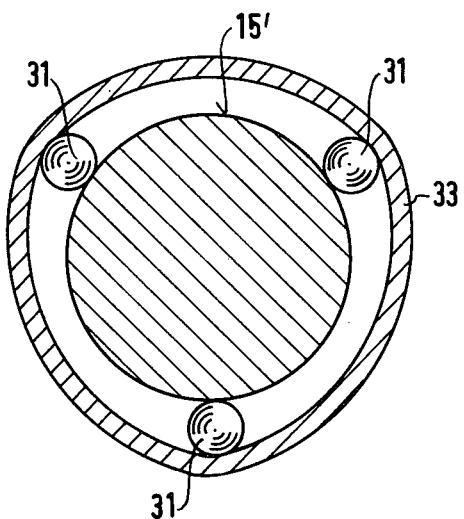
FIG. 4 is a schematic representation of the preloading system of the device according to the invention.

FIG. 4 shows an alternate embodiment form of a spring element 33 for the rolling bodies 31, which are pressed by said spring element 33 with a continuous preload against a rubbing contact track, for example, 15'. In contrast to the embodiment according to FIGS. 1 and 2, the ring-shaped spring element 33, also having, for example, an electrical connection element, has an outer circumference with is smaller than the outer, theoretical race-diameter of the rolling bodies 31, in such a manner that the spring element 33 takes a polygonal shape, and is continuously polygonally deformed during the rolling motion, i.e. at the displacement of the spring element 33 relative to the rubbing contact track 15'. The polygonal shape of the spring element 33 is exaggeratedly shown in FIG. 4. In actuality, the outer circumference of the spring element 33 is only a little smaller, for example, a few 1/10 millimeter than the theoretical runningcircle circumference of the rolling bodies 31. In any case, the rolling bodies are in this manner continuously preloaded against the rubbing contact track 15', so that between the electrically acting contact elements 15 and 25, respectively 16 and 26, according to FIGS. 1 and 2, a uniformly good electric contact is established through the rolling bodies 31 without a transfer resistance worth mentioning.

Figure 3:
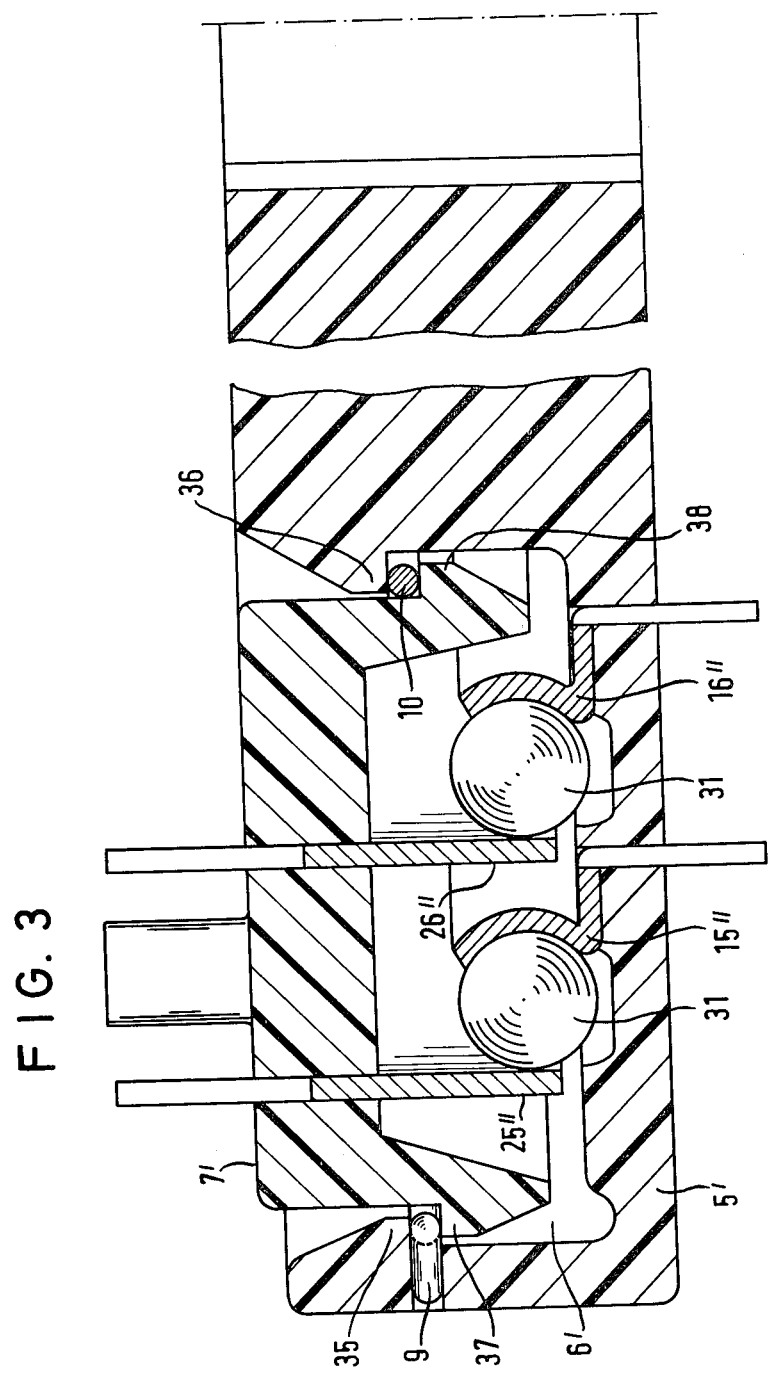
FIG. 3 is another embodiment form of the device according to the invention with radially preloaded rolling elements.

A difference between the embodiment according to FIGS. 1 and 2 and the embodiment according to FIG. 3 is the feature that detention rims 35 and 36 are provided at the inner and outer annular edges of the support plate 5', which protrude into the recess 6'. Correspondingly, the annular cover ring 7' has detention edges 37 and 38, which extend outwardly, respectively inwardly, which through the interposition of the spring rings 9, 10 engage with each other. This is made possible by the fact that the cover ring 7' consists of an elastic material, so that the detention edges 37 and 38 can be deformed by pressure, whereafter the parts 5' and 7' are, by a snap-connection, joined to each other in such a way that they can be rotated with respect to each other, as is also the case in the embodiment according to FIGS. 1 and 2. A further difference compared to the embodiment according to FIGS. 1 and 2, lies in the feature that, at the arrangement for the electric connection according to FIG. 3, the rolling bodies 31 are not retained in cages, but are freely pressed against the rubbing contact tracks of the opposing contact elements 15" and 16", by the spring action of the contact elements 25", respectively 26". In contrast thereto, in the embodiment according to FIGS. 1 and 2, the rolling bodies are retained in cages, so that they can slide in the radial direction.

The devices described with the aid of FIGS. 1-4 serve for the electrical connection between electrical elements or structural parts which are rigidly connected to the chassis of a motor vehicle, and electrical elements or electrical structural parts which are directly or indirectly connected to the rotatable steering shaft 1, for example elements arranged at the steering wheel 3.

Figure 5:
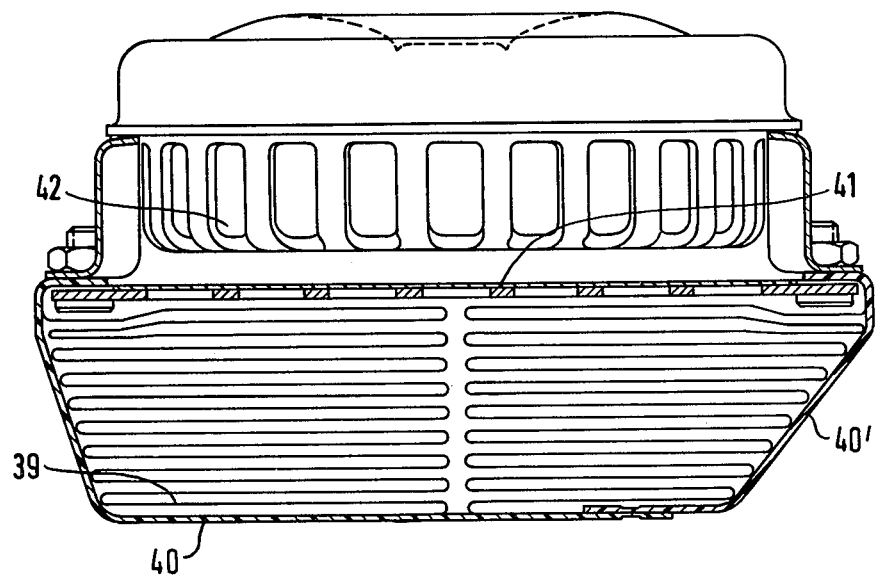
FIG. 5 is a side view in partial section of a safety device in the form of an inflatable airbag at the steering wheel of a motor vehicle.

FIG. 5 shows as an example, an electrically operable safety device for impact protection for the vehicle passengers, which is mounted in the center of the steering wheel. This safety device consists of a folded air bag 39, which is contained in the folded state between two cover shells 40 and 40'. These cover shells are attached by thin hinges at the side edges of a base plate 41. An actuator 42 is, for example, in the form of an electrically ignited pyrotechnical charge. By the abovedescribed device for the electrical connection, the ignition arrangement 42 is in electrical connection with a sensor arranged at the vehicle chassis. The sensor is activated as a result of a crash, and closes a switch of an ignition circuit with current conducted through the device according to FIGS. 1-4, i.e. the current flows through the chassis-fixed and rotatable contact elements and through the rolling bodies 31. The contact element 15, the rolling body 31 and the contact element 25 can serve as the electrical supply line, and the contact element 16, rolling body 31 and contact element 26 can serve as the electrical return line. With the closing of the ignition current circuit, the pyrotechnical charge is ignited, and the air bag 39 is instantly inflated, pushing apart the cover shells 40 and 40'.

Figure 6:
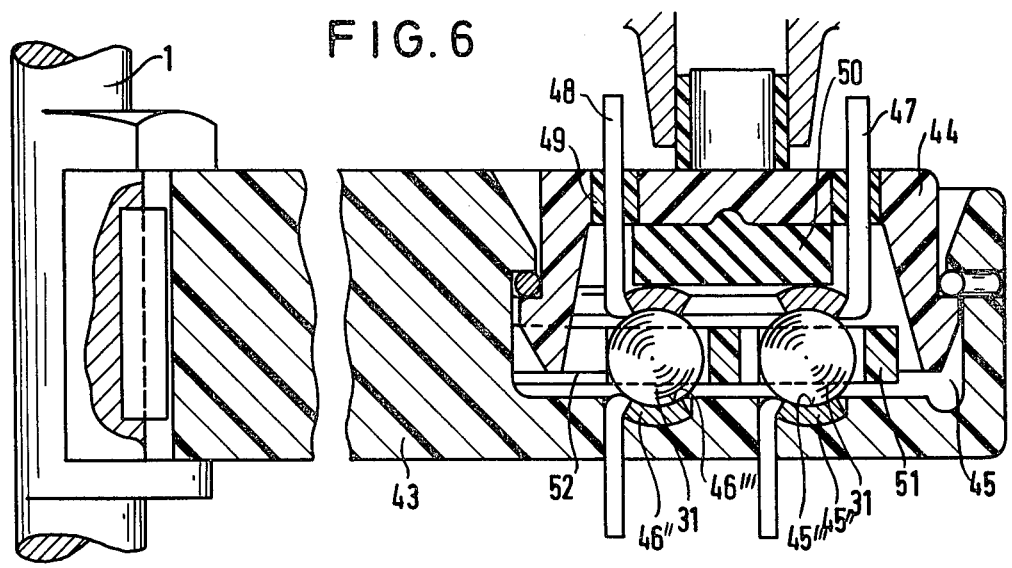
FIG. 6 is a partial sectional view of a device according to the invention, with axial-preload of the rolling elements, secured to the steering shaft of a motor vehicle.
Figure 7:
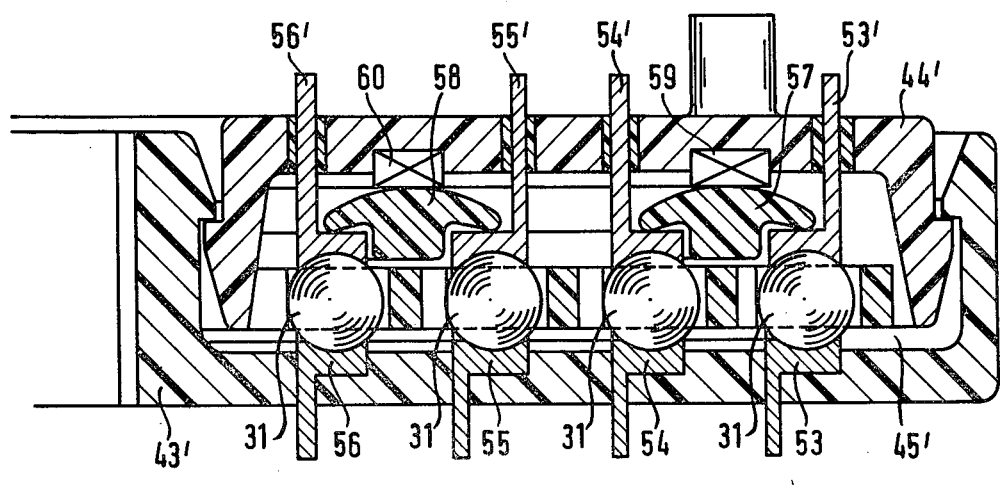
FIG. 7 is another embodiment form of the device according to the invention, constructed according to the principle of FIG. 6.
Figure 8:
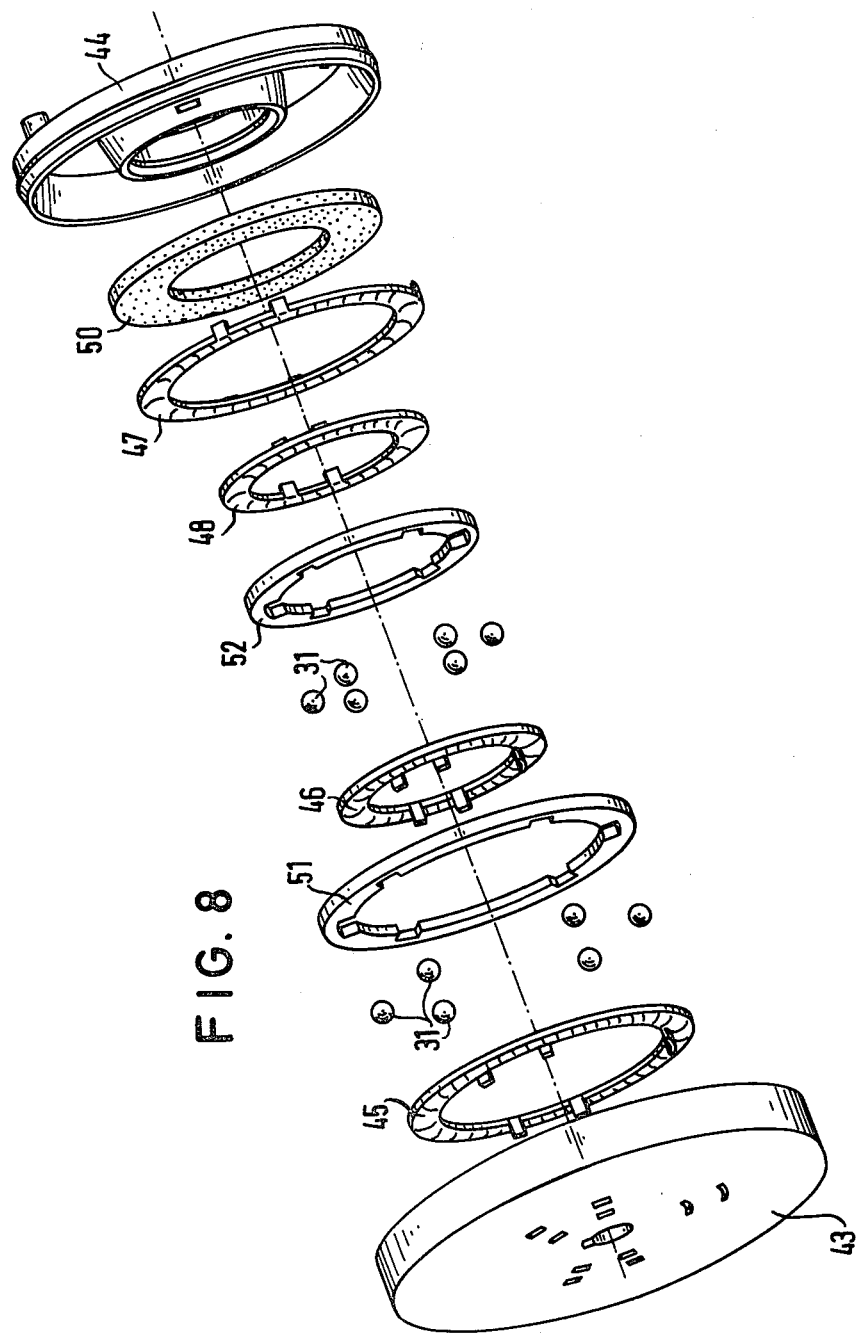
FIG. 8 is an exploded view of the device according to FIG. 6

While in the embodiments according to FIGS. 1 to 4, the rolling bodies 31 are tensioned radially with respect to the rubbing contact tracks, in the embodiments according to FIGS. 6, 7 and 8 the rolling bodies 31 are tensioned axially in relation to the steering shaft axis against the respective contact elements. Similar to the previously described embodiments, here also a disc-shaped housing is formed by a support-plate 43, FIG. 6, or 43', FIG. 7, attached to the steering shaft 1, and an annular cover plate 44, respectively 44'. The cover rings 44, 44' again extend into annular recesses 45, 45' of the support plate 43, 43' and are retained by a snap-connection, in such a manner that these parts can be rotated relative to each other. In the embodiment according to FIGS. 6 and 8, the support plate 43 carries ringshaped contact elements 45" and 46" of different diameters with rubbing contact tracks 45" and 46" which are concave in the axial direction, while the cover ring 44 is provided with corresponding counter-contact elements 47 and 48 with corresponding rubbing contact tracks. Again, all contact elements have electrical connection elements, which in the case of the cover ring 44 are conducted through insulating and sealing bushings 49. A spring-or pressure element is designated by 50, which has a ring-shape, and consists of a rubber-like elastic, non-electrically conducting material. By means of the spring- or pressure element 50 the contact elements 47 and 48 are both pressed against the associated rolling bodies 31, and the contact elements 45" and 46", which means they are continuously braced against them. The rolling bodies 31 are also made in the form of balls which are retained in axial-ball cages 51 and 52 of different diameters.

In contrast to the embodiment according to FIGS. 6 and 8, wherein the device has electrical terminals for one supply- and return line, the device according to FIG. 7 has two pairs of supply and return lines, which are formed by four ring-shaped contact element pairs 53, 53', 54 and 54', and 55 and 55', 56 and 56'.

One annular pressure element 57 and 58 of different diameter is provided for each of the two contact-element pairs. The pressure elements 57, 58 have a mushroom-like profile and consist of an insulating material. Each pressure element 57 and 58 is associated with a spring element 59, respectively 60, which has the function of continuously tensioning the contact-element pairs by the pressure elements 57, 58 against the rolling bodies 31 which are arranged between them.

I claim:

1. Device for the electrical connection of at least two structural elements which are arranged on a steering wheel axis of a motor vehicle and rotatable with respect to each other, which comprises a first structural element having a first contact element attached to a steering shaft and rotatable therewith, a second structural element having a stationary second contact element adjacent the first contact element and spaced from the first contact element to allow for the insertion of rolling bodies, a plurality of rolling bodies made of an electrically conducting material for electrical connection between the first and second contact elements, and means for urging the first and second contact elements into contact with the rolling bodies, said rolling bodies being in the form of balls retained in cages, said balls being positioned in engagement with at least said first and second contact elements to form contact tracks for electrical supply and return lines, said first and second contact elements being ring-shaped with axially extending connection elements, at least two concentric, ring-shaped contact element pairs being provided for the electrical supply and return lines, said ring-shaped contact elements being of different diameters with said rolling bodies interposed therebetween and with the ring-shaped contact elements being elastically pressed against said rolling bodies in a radial direction, at least one ring-shaped contact element in each contact element pair being radially elastic.

2. Device according to claim 1, wherein the spring element forms the outer or inner contact element, and is provided with electrical connecting elements.

3. Device according to claim 1, wherein the ring-shaped spring element has segment-tongues, which are elastically tensioned in the direction of the rolling bodies, and are separated from each other by slots.

4. Device according to claim 3, wherein the division of the segment-tongues distributed at the circumference of the spring element is different than the distribution of the rolling bodies.

5. A compactly constructed apparatus for conducting a small electrical current to facilitate monitoring of the condition of a safety system connected with a steering wheel of a vehicle prior to the occurrence of an accident, said apparatus comprising a housing having a movable section which is connectable with the steering wheel for rotation therewith and a stationary section which is held against rotation with the steering wheel, a first circular contact ring formed of an electrically conductive material and connected to one of said sections of said housing, said first contact ring having an annular radially outwardly facing side surface which is disposed in a coaxial relationship with an axis about which said movable housing section rotates upon rotation of the steering wheel, a second circular contact ring disposed radially outwardly of and axially aligned with said first contact ring, said second contact ring being formed of an electrically conductive material and connected to a section of said housing other than the section to which said first contact ring is connected, said second contact ring having an annular side surface which faces radially inwardly toward and is coaxial with said radially outwardly facing side surface of said first contact ring, a first series of rotatable bodies disposed in an annular between said first and second contact rings in a coaxial relationship with the axis about which said movable housing section rotates, said first series of rotatable bodies being formed of an electrically conductive material and being disposed in engagement with said side surface of said first contact ring and said side surface of said second contact ring, at least one of said first and second contact rings being resiliently deflected in a radial direction relative to the other contact ring to provide a spring force which continuously urges said contact rings and rotatable bodies into firm engagement to provide a low resistance electrical connection between said first and second contact rings through said rotatable bodies, said apparatus being free of means for providing spring force for urging said first and second contact rings and said first series of rotatable bodies into engagement other than the spring force provided by resilient deflection of at least one of said first and second contact rings to thereby promote the compact construction of said apparatus, a third contact ring disposed radially outwardly of and axially aligned with said second contact ring, said third contact ring being formed of an electrically conductive material and connected to one of said sections of said housing in a coaxial relationship with the axis about which said movable section of said housing rotates upon rotation of the steering wheel, said third contact ring having an annular radially outwardly facing side surface, a fourth contact ring disposed radially outwardly of and axially aligned with said third contact ring, said fourth contact ring being formed of an electrically conductive material and being connected to a section of said housing other than the section to which said third contact ring is connected, said fourth contact ring having an annular side surface which faces radially inwardly toward and is coaxial with said radially outwardly facing side surface of said third contact ring, a second series of rotatable bodies disposed in an annular array between said third and fourth contact rings in a coaxial relationship with the axis about which said movable housing section rotates, said second series of rotatable bodies being formed of an electrically conductive material and being disposed in engagement with said radially facing side surface of said third contact ring and said radially facing side surface of said fourth contact ring, at least one of said third and fourth contact rings being resiliently deflected in a radial direction relative to the other contact ring to provide a spring force which continuously urges said third and fourth contact rings and second series of rotatable bodies into firm engagement to provide a low resistance electrical connection between said third and fourth contact rings through said second series of rotatable bodies, said apparatus being free of means for providing spring force for urging said third and fourth contact rings and said second series of rotatable bodies into engagement other than the spring force provided by resilient deflection of at least one of said third and fourth contact rings to thereby promote the compact construction of said apparatus, said first and second contact rings and said first series of rotatable bodies cooperating to conduct a relatively small electrical current in a first direction during monitoring of the condition of the safety system, said third and fourth contact rings and second series of rotatable bodies cooperating to conduct the relatively small electrical current in a second direction during monitoring of the condition of the safety system.

6. An apparatus as set forth in claim 5 wherein one of said movable and stationary sections of said housing includes surface means for defining an annular recess in which the other one of said housing sections is at least partially disposed, said housing further including means for interconnecting said housing sections to accommodate relative rotation between said housing sections.

7. An apparatus as set forth in claim 5 wherein one of said first and second contact rings includes an annular main section and a plurality of spring segments which extend axially outwardly from said main section, each of said spring segments being resiliently deflectable by engagement with one of the rotatable bodies of said first series of rotatable bodies, said radially facing side surface of the other one of said first and second contact rings having an arcuately curving cross sectional configuration in a radial plane to form an annular track for receiving the rotatable bodies of said first series of rotatable bodies, one of said third and fourth contact rings including an annular main section and a plurality of spring segments which extend axially outwardly from said main section of said one of said third and fourth contact rings, each of said spring segments of said one of said third and fourth contact rings being resiliently deflectable by engagement with one of the rotatable bodies of said second series of rotatable bodies, said radially facing side surface of the other one of said third and fourth contact rings having an arcuately curving cross sectional configuration in a radial plane to form an annular track for receiving the rotatable bodies of said second series of rotatable bodies.

8. An apparatus for conducting a small electrical current to facilitate monitoring of the condition of a safety apparatus connected with a steering wheel of a vehicle prior to the occurrence of an accident, said apparatus comprising a housing having a movable section which is connectable with the steering wheel for rotation therewith a stationary section which is held against rotation with the steering wheel, a first pair of contact rings, said first pair of contact rings including a first contact ring formed of an electrically conductive material and connected to said movable section of said housing for rotation therewith upon rotation of the steering wheel, said first contact ring having an annular side surface which faces in a first axial direction and is disposed in a coaxial relationship with an axis about which said movable housing section rotates upon rotation of the steering wheel, said first pair of contact rings including a second circular contact ring which is axially offset from and radially aligned with said first contact ring, said second contact ring being formed of an electrically conductive material and being connected to said stationary section of said housing, said second contact ring having an annular side surface which faces in a second axial direction toward and is coaxial with said side surface of said first contact ring, a first series of rotatable bodies disposed in an annular array between said first and second contact rings in a coaxial relationship with the axis about which said movable housing rotates, said first series of rotatable bodies being formed of an electrically conductive material and being disposed in engagement with said side surfaces of said first and second contact rings, a second pair of contact rings disposed radially outwardly of said first pair of contact rings, said second pair of contact rings including a third circular contact ring which is disposed radially outwardly of and in axial alignment with said first contact ring, said third contact ring being formed of an electrically conductive material and connected to said movable section of said housing for rotation therewith upon rotation of the steering wheel, said third contact ring having an annular side surface which faces in the first axial direction and is disposed in a coaxial relationship with an axis about which said movable housing section rotates upon rotation of the steering wheel, said second pair of contact rings including a fourth circular contact ring which is radially aligned with said second contact ring and is axially aligned with said third contact ring, said fourth contact ring being formed of an electrically conductive material and being connected to said stationary section of said housing, said fourth contact ring having an annular side surface which faces in the second axial direction toward and is coaxial with said side surface of said third contact ring, a second series of rotatable bodies disposed in an annular array between said third and fourth contact rings in a coaxial relationship with the axis about which said movable housing section rotates, said second series of rotatable bodies being formed of an electrically conductive material and being disposed in engagement with said side surfaces of said third and fourth contact rings, and springs means disposed in engagement with and radially spanning an annular space between one of said contact rings of said first pair of contact rings and one of said contact rings of said second pair of contact rings to continuously urge said one contact ring of each pair of contact rings axially toward the other contact ring with a force which is substantially constant throughout the extent of the first and second arrays of rotatable bodies to provide a low resistance electrical connection between said first and second contact rings through said first series of rotatable bodies and to provide a low resistance electrical connection between said third and fourth contact rings through said second series of rotatable bodies, said spring means including an annular body of electrically insulating material which radially spans the annular space between the first and second pairs of contact rings and is disposed in a coaxial relationship with the axis about which said movable housing section rotates upon rotation of the steering wheel.

9. A compactly constructed apparatus for conducting a small electrical current to facilitate monitoring of the condition of a safety system connected with a steering wheel of a vehicle prior to the occurrence of an accident, said apparatus comprising a housing having a movable section which is connectable with the steering wheel for rotation therewith and a stationary section which is held against rotation with the steering wheel, a first circular contact ring formed of an electrically conductive material and connected to one of said sections of said housing, said first contact ring having an annular side surface which is disposed in a coaxial relationship with an axis about which said movable housing section rotates upon rotation of the steering wheel, a second circular contact ring disposed in a coaxial relation with said first contact ring, said second contact ring being formed of an electrically conductive material and connected to a section of said housing other than the section to which said first contact ring is connected, said second contact ring having an annular side surface which faces toward and is coaxial with said side surface of said first contact ring, a first series of rotatable bodies disposed in an annular array between said first and second contact rings in a coaxial relationship with the axis about which said movable housing section rotates, said first series of rotatable bodies being formed of an electrically conductive material and being disposed in engagement with said side surface of said first contact ring and said side surface of said second contact ring, at least one of said first and second contact rings being resiliently deflected relative to the other contact ring to provide a spring force which continuously urges said contact rings and rotatable bodies into firm engagement to provide a low resistance electrical connection between said first and second contact rings through said rotatable bodies, said apparatus being free of means for providing spring force for urging said first and second contact rings and said first series of rotatable bodies into engagement other than the spring force provided by resilient deflection of at least one of said first and second contact rings to thereby promote the compact construction of said apparatus, a third contact ring disposed radially outwardly of said first contact ring, said third contact ring being formed of an electrically conductive material and connected to one of said sections of said housing in a coaxial relationship with the axis about which said movable section of said housing rotates upon rotation of the steering wheel, said third contact ring having an annular side surface, a fourth contact ring disposed radially outwardly of said second contact ring, said fourth contact ring being formed of an electrically conductive material and being connected to a section of said housing other than the section to which said third contact ring is connected, said fourth contact ring having an annular side surface which faces toward and is coaxial with said side surface of said third contact ring, a second series of rotatable bodies disposed in an annular array between said third and fourth contact rings in a coaxial relationship with the axis about which said movable housing section rotates, said section series of rotatable bodies being formed of an electrically conductive material and being disposed in engagement with said side surface of said third contact ring and said side surface of said fourth contact ring, at least one of said third and fourth contact rings being resiliently deflected relative to the other contact ring to provide a spring force which continuously urges said third and fourth contact rings and second series of rotatable bodies into firm engagement to provide a low resistance electrical connection between said third and fourth contact rings through said second series of rotatable bodies, said apparatus being free of means for providing spring force for urging said third and fourth contact rings and said second series of rotatable bodies into engagement other than the spring force provided by resilient deflection of at least one of said third and fourth contact rings to thereby promote the compact construction of said apparatus, said first and second contact rings and said first series of rotatable bodies cooperating to conduct a relatively small electrical current in a first direction during monitoring of the condition of the safety system, said third and fourth contact rings and said second series of rotatable bodies cooperating to conduct the relatively small electrical current in a second direction during monitoring of the condition of the safety system.

* * * * *

UNITED STATES PATENT AND TRADEMARK OFFICE
CERTIFICATE OF CORRECTION

PATENT NO. : 4,462,648
DATED : July 31, 1984
INVENTOR(S) : Artur Fohl

It is certified that error appears in the above-identified patent and that said Letters Patent are hereby corrected as shown below:

Column 8, line 65, after "therewith" insert - - and - -.

Column 9, line 18, after "housing" insert - - section - -.

Column 10, line 17, change "relation" to - - relationship - -.

Column 10, line 62, change "section" (second occurrence) to -- second --.

Signed and Sealed this

*Twelfth* Day of *March 1985*

[SEAL]

Attest:

DONALD J. QUIGG

*Attesting Officer*     *Acting Commissioner of Patents and Trademarks*